US012584505B2

(12) United States Patent　　(10) Patent No.: US 12,584,505 B2

Sabur　　(45) Date of Patent: Mar. 24, 2026

(54) MODULAR STORAGE CLIP

(71) Applicant: Vanessa Sabur, Montclair, NJ (US)

(72) Inventor: Vanessa Sabur, Montclair, NJ (US)

( * ) Notice: Subject to any disclaimer, the term of this patent is extended or adjusted under 35 U.S.C. 154(b) by 0 days.

(21) Appl. No.: 18/223,834

(22) Filed: Jul. 19, 2023

(65) Prior Publication Data

US 2024/0026911 A1　　Jan. 25, 2024

Related U.S. Application Data

(60) Provisional application No. 63/368,834, filed on Jul. 19, 2022.

(51) Int. Cl.
　　*F16B 2/22*　　(2006.01)
(52) U.S. Cl.
　　CPC ..................................... *F16B 2/22* (2013.01)
(58) Field of Classification Search
　　CPC ...... F16B 2/20; F16B 2/22; F16B 2/24; F16B 2/245; Y10T 24/31; Y10T 24/344; Y10T 24/3443; Y10T 24/44; Y10T 24/44983; Y10T 24/44991
　　USPC ................................ 248/682, 689, 911, 912
　　See application file for complete search history.

(56) References Cited

U.S. PATENT DOCUMENTS

| | | | | | |
|---|---|---|---|---|---|
| 1,441,455 | A | * | 1/1923 | Rudall ...................... | F16B 2/22 |
| | | | | | 403/191 |
| 2,371,959 | A | * | 3/1945 | Duffield ............... | A62C 13/003 |
| | | | | | 222/530 |
| 2,732,581 | A | * | 1/1956 | Heck ......................... | E05D 5/10 |
| | | | | | 16/257 |
| 3,013,654 | A | * | 12/1961 | Hoff ........................ | D06F 55/00 |
| | | | | | 206/820 |
| 4,026,413 | A | * | 5/1977 | Britt .................... | B65D 33/1625 |
| | | | | | 24/561 |
| 4,521,035 | A | * | 6/1985 | Berezowsky ............. | B42F 9/00 |
| | | | | | 281/48 |
| 5,100,358 | A | * | 3/1992 | Volgger ................. | A63H 33/08 |
| | | | | | 446/104 |
| 5,172,534 | A | * | 12/1992 | Milner ................. | A63H 33/042 |
| | | | | | 446/104 |
| 5,473,796 | A | * | 12/1995 | Fusillo ............... | B65D 33/1675 |
| | | | | | 24/30.5 R |
| 5,666,702 | A | * | 9/1997 | Ming-Chieh ........... | B42F 1/006 |
| | | | | | 24/563 |
| 6,408,492 | B1 | * | 6/2002 | Sparks ................... | A01K 97/08 |
| | | | | | 24/336 |
| 7,387,223 | B2 | * | 6/2008 | Misumi ................... | D06F 55/02 |
| | | | | | 24/326 |
| 8,083,432 | B2 | * | 12/2011 | Limpert .................. | F16L 3/16 |
| | | | | | 24/336 |
| 8,091,184 | B2 | * | 1/2012 | Santin ................. | B60N 2/5825 |
| | | | | | 24/339 |

(Continued)

*Primary Examiner* — Jason W San

*Assistant Examiner* — Anna S Rashid

(74) *Attorney, Agent, or Firm* — Lerner David LLP

(57)　　　　ABSTRACT

A modular storage clip and a kit including a plurality of the same are provided. The modular storage clip, notably, can secure an object within an interior cavity and can rotatably connect to other modular storage clips, forming a stable structure capable of rotating about the points of connection and holding multiple objects. The modular storage clip and kit are thus useful, for instance, for storing and organizing numerous cosmetic items in preparation for a cosmetic routine.

17 Claims, 3 Drawing Sheets

(56)                    References Cited

U.S. PATENT DOCUMENTS

| | | | | |
|---|---|---|---|---|
| 8,272,612 | B2 * | 9/2012 | Thorpe | F16B 2/10 |
| | | | | 24/339 |
| 8,307,835 | B2 * | 11/2012 | King | A45D 8/24 |
| | | | | 132/277 |
| 8,887,354 | B1 * | 11/2014 | Weinman | E05D 5/06 |
| | | | | 24/336 |
| 9,296,059 | B2 * | 3/2016 | Hobson | B23K 9/202 |
| 9,481,492 | B2 * | 11/2016 | Vantrease | B65D 33/16 |
| 9,593,702 | B2 * | 3/2017 | Hooper, Jr. | F16B 12/44 |
| D794,502 | S * | 8/2017 | Siegel | D11/160 |
| 10,286,332 | B2 * | 5/2019 | Fish | A63H 33/062 |
| D1,002,357 | S * | 10/2023 | Limber | C09J 7/385 |
| | | | | D8/395 |
| RE49,902 | E * | 4/2024 | Legall | F24S 25/634 |
| D1,028,649 | S * | 5/2024 | de Jong | D8/1 |
| 12,025,176 | B2 * | 7/2024 | Paulucci | F16B 5/0052 |
| 2001/0023626 | A1 * | 9/2001 | Perez Romo | B25B 7/02 |
| | | | | 81/426 |
| 2006/0042050 | A1 * | 3/2006 | Misumi | D06F 55/02 |
| | | | | 24/3.1 |
| 2010/0018013 | A1 * | 1/2010 | Vermillion | F16B 2/22 |
| | | | | 24/595.1 |
| 2010/0148015 | A1 * | 6/2010 | Matsuno | F16L 3/1075 |
| | | | | 248/65 |
| 2012/0141050 | A1 * | 6/2012 | Moreau | A45F 5/102 |
| | | | | 24/298 |

| | | | | |
|---|---|---|---|---|
| 2012/0151721 | A1 * | 6/2012 | Lin | B25B 5/06 |
| | | | | 24/457 |
| 2012/0233821 | A1 * | 9/2012 | Hobson | B23K 35/0288 |
| | | | | 24/571 |
| 2013/0111717 | A1 * | 5/2013 | Rogers | A43C 7/005 |
| | | | | 24/712.3 |
| 2014/0250635 | A1 * | 9/2014 | Vantrease | B65D 33/1625 |
| | | | | 24/30.5 S |
| 2015/0082609 | A1 * | 3/2015 | Hooper, Jr. | F16B 7/22 |
| | | | | 403/205 |
| 2015/0330110 | A1 * | 11/2015 | Jaworski | F16B 2/10 |
| | | | | 24/298 |
| 2022/0102951 | A1 * | 3/2022 | Badrenas | B60R 16/0215 |
| 2022/0113010 | A1 * | 4/2022 | Navabi | F16M 13/022 |
| 2022/0154855 | A1 * | 5/2022 | George-Fowler | B25H 3/00 |
| 2022/0271706 | A1 * | 8/2022 | Creasy | H02S 30/10 |
| 2022/0373130 | A1 * | 11/2022 | Walker | F16M 13/022 |
| 2023/0038546 | A1 * | 2/2023 | Huang | B60R 9/10 |
| 2023/0232755 | A1 * | 7/2023 | De Jong | F16B 2/22 |
| | | | | 47/44 |
| 2023/0296192 | A1 * | 9/2023 | Michael | H02G 3/32 |
| | | | | 248/65 |
| 2023/0313820 | A1 * | 10/2023 | Li | F16B 21/20 |
| | | | | 24/458 |
| 2024/0008212 | A1 * | 1/2024 | Chen | H05K 7/1491 |
| 2024/0077171 | A1 * | 3/2024 | Tang | F16B 2/20 |
| 2024/0183374 | A1 * | 6/2024 | Fabian | F16B 5/0664 |

* cited by examiner

MODULAR STORAGE CLIP

CLAIM OF PRIORITY

This application claims priority to U.S. Provisional Patent Appl. No. 63/368,834 entitled "MODULAR STORAGE CLIP" filed on Jul. 19, 2022, the contents of which are hereby incorporated by reference in their entirety.

NOTICE OF COPYRIGHTS AND TRADE DRESS

FIELD OF THE EMBODIMENTS

The present disclosure relates generally to the field of clips or storage solutions and more specifically relates to a novel device for storing and arranging items, especially cosmetics.

BACKGROUND

Numerous cosmetic products are often required for a single cosmetic routine. A user may perform the cosmetic routine from one seated position, requiring each cosmetic product to be within arm's reach. But it may be difficult for the user to store the myriad of cosmetics in a way that allows for easy access and quick organization in preparation for the cosmetic routine. Cosmetic products are usually held in small containers that may be tubular, rectangular, rounded, or irregularly shaped, and many users store them in containers or bags where they may be rolled around, knocked over, and scrambled.

Although some manufacturers have attempted to solve this problem by making individual products easier to organize or manage, no universal solution exists that would allow any conceivable array of cosmetic products to be easily stored and organized.

Therefore, there exists a need for a device which can lock such items together for easier storage, organization, and convenience before, during, and after their use.

SUMMARY OF THE INVENTION

The present disclosure provides a modular storage clip including a base member, a pair of wings, each wing connected to opposite ends of the base member, a cavity configured to secure an object within, the cavity being at least partially bounded by the base member and the pair of wings, and a connector which is configured to removably attach to a second connector of a second modular storage clip.

In an embodiment, each wing extends outwardly from the base member and converges toward the other wing.

In an embodiment, each wing includes an end opposite the base member, and an opening is at least partially bounded by each end of each wing. In a further embodiment, the pair of wings is configured to flexibly adjust a size of the opening.

In an embodiment, the cavity is configured to secure the object through one or more of a snap fit, a press fit, a clearance fit, a transition fit, a clamp, a joint, a hinge, or a clip.

In an embodiment, one or more of the base member and the pair of wings includes a protrusion extending into the cavity, the protrusion being configured to secure the object through one or more of a snap fit, a press fit, a clearance fit, a transition fit, a clamp, a joint, a hinge, or a clip.

In an embodiment, the connector includes a male connection component and a female connection component. In a further embodiment, the male connection component includes two symmetrical components separated by a gap extending therebetween. In a further embodiment, each symmetrical component includes an inner wall facing the other symmetrical component, an outer wall opposite the inner wall, and a button disposed on the outer wall and configured to removably attach to a portion of the female connection component.

In an embodiment, the connector is disposed on an exterior surface of the base member.

In an embodiment, the connector is configured to removably attach to the second connector through one or more of a snap fit, a press fit, a clearance fit, a transition fit, a clamp, a joint, a hinge, or a clip.

In an embodiment, the connector has a first configuration in which the modular storage clip is pivotable around a point of connection, and a second configuration in which movement of the modular storage clip around the point of connection is prevented.

In an embodiment, the connector includes means for removably attaching the connector to the second connector.

Further provided is a kit containing a plurality of modular storage clips, each modular storage clip including a base member, a pair of wings, each wing connected to opposite ends of the base member, a cavity configured to secure an object within, the cavity being at least partially bounded by the base member and the pair of wings, and a connector. Each connector is configured to removably attach to a connector of another modular storage clip.

In an embodiment, each connector includes a male connection component and a female connection component, each male connection component is configured to removably attach to each female connection component, and each female connection component is configured to removably attach to each male connection component.

In an embodiment, each connector includes means for removably attaching one connector to a connector of another modular storage clip.

In an embodiment, each connector includes a first configuration in which each modular storage clip is pivotable around a point of connection, and a second configuration in which movement of each modular storage clip around the point of connection is prevented. Each connector is independently adjustable between the first configuration and the second configuration.

The claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

Implementations may include one or a combination of any two or more of the aforementioned features or embodiments.

These and other aspects, features, implementations, and advantages can be expressed as methods, apparatuses, systems, components, program products, business methods, and means or steps for performing functions, or some combination thereof.

Other features, aspects, implementations, and advantages will become apparent from the descriptions, the drawings, and the claims.

DETAILED DESCRIPTION OF THE PREFERRED EMBODIMENTS

Reference will now be made in detail to each embodiment of the present invention. Such embodiments are provided by way of explanation of the present invention, which is not intended to be limited thereto in any manner whatsoever. In fact, those of ordinary skill in the art may appreciate upon reading the present specification and viewing the present drawings that various modifications and variations can be made thereto.

For purposes of the present disclosure of the invention, unless specifically disclaimed, the singular includes the plural and vice-versa, the words "and" and "or" shall be both conjunctive and disjunctive, the words "any" and "all" shall both mean "any and all".

Currently, consumers and users of cosmetic products have no universal device or method for efficiently organizing and storing their cosmetic products. Embodiments of the present disclosure solve this problem by providing a device which is capable of storing an object, such as a cosmetic product, within the device, and which is also capable of connecting to other such devices to contain multiple objects near one another in a single organized structure. These embodiments are capable of storing any feasibly sized and shaped object or plurality of objects, but the embodiments are preferably designed to specifically facilitate the storage and organization of cosmetic products.

The modular storage clip, plurality of the same, and kit including the plurality, which are described below, are designed to secure one or more objects within each modular storage clip. In some particular embodiments, the modular storage clip is designed to secure cosmetics, especially those that roll around, are easily knocked down, and which may be easily lost in the bottoms of storage containers such as handbags. The modular storage clip allows a user to easily arrange these items while stationary, and allows them to be stored in an organized manner for easy access after transportation in storage. Locking the items together in a bundle makes them easier to find because each item is connected to a single physical unit which can easily be retrieved by the user. In other embodiments, the modular storage clip of the present disclosure may be configured to hold any products in need of storage. The modular storage clip of the present disclosure is designed such that it may be used to store objects both in a stationary position, such as on a countertop or other table, or in the case of cosmetics, on a vanity, or be carried within a bag or other storage container without removal of objects within the modular storage clip.

Figure 1:
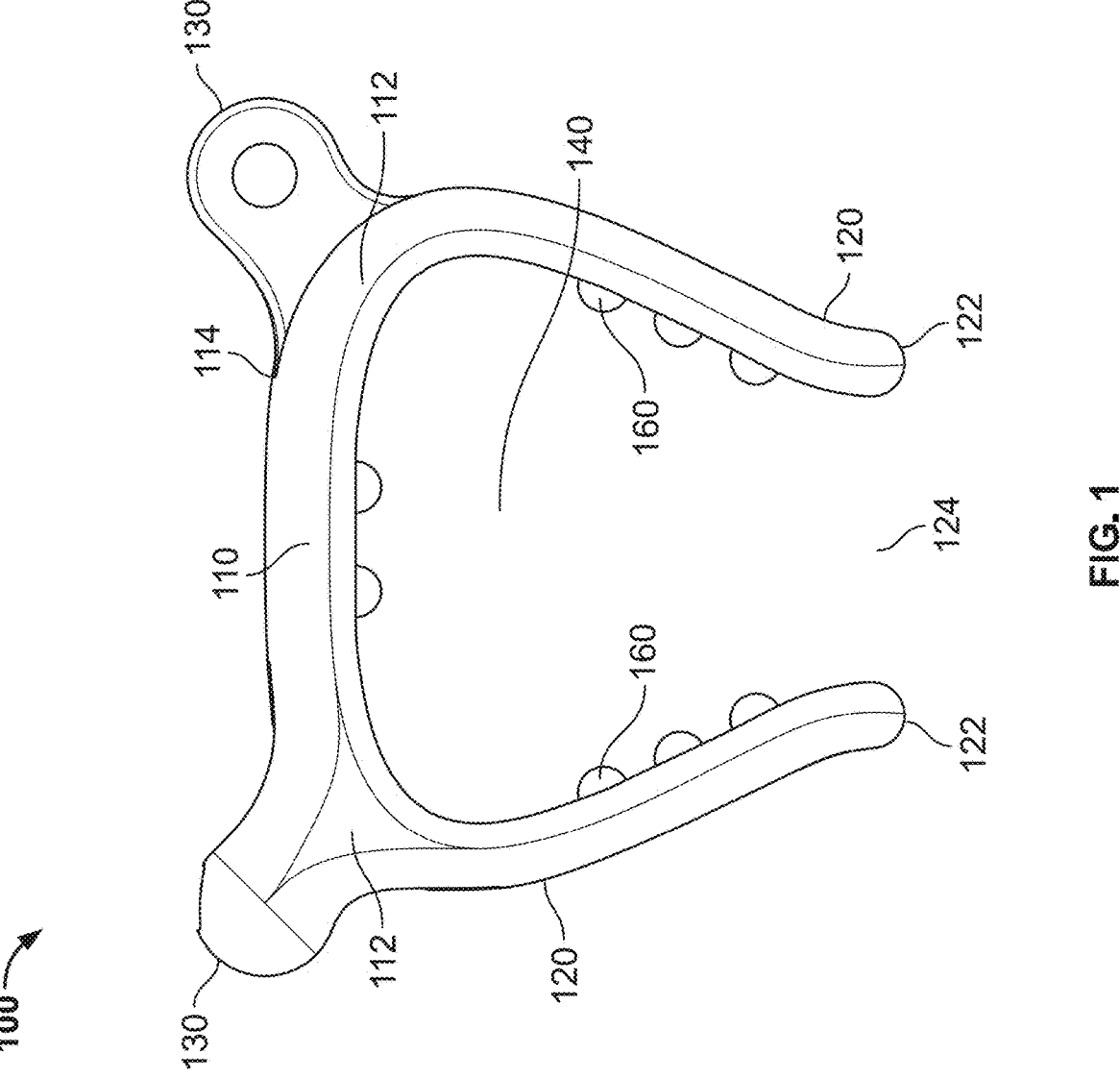
FIG. 1 is a front perspective view showing the modular storage clip according to one or more embodiments.

Referring now to FIG. 1, the present disclosure provides for a modular storage clip 100 which includes a base member 110. In some embodiments, the base member 110 is rigid or semi-rigid. Rigidity imparts stability to the modular storage clip 100 such that it may be self-supporting and free-standing, but the base member 110 may be semi-rigid to allow some flexibility. Flexibility may facilitate, for instance, securing differently sized and shaped objects in the modular storage clip 100, as well as forming various structures of connected modular storage clips 100. In some preferred embodiments, the base member 110 is formed of one or more lightweight, low cost, semi-rigid materials, such as a thermoplastic. However, in other embodiments, the material of the base member 110 may be rigid, semi-rigid, or flexible. Furthermore, in some embodiments, the base member 110 may be formed of a metal, wood, a plastic, a composite, any other solid material capable of imparting rigidity or flexibility, or combinations thereof.

The modular storage clip 100 further includes a pair of wings 120, each wing 120 connected to opposite ends 112 of the base member 110. In some embodiments, each wing 120 is semi-rigid or flexible. In some further embodiments, each wing 120 is more flexible than the base member 110, such that the base member 110 provides rigidity to the modular storage clip 100 while the pair of wings 120 provides flexibility thereto. In some preferred embodiments, each wing 120 is formed of one or more lightweight, low cost, semi-rigid materials, such as a thermoplastic. However, in other embodiments, the material of each wing 120 may independently be rigid, semi-rigid, or flexible. Furthermore, in some embodiments, each wing 120 may independently be formed of a metal, wood, a plastic, a composite, any other solid material capable of imparting rigidity or flexibility, or combinations thereof. In some particular embodiments, each wing 120 is composed of the same material or combination of materials. In some particular embodiments, the base member 110 and each wing 120 are composed of the same material or combination of materials. In other embodiments, each of the base member 110 and each wing 120 are members which are independently composed of various materials or combinations thereof, which may or may not overlap with the materials or combinations thereof of the other members.

In some embodiments and as shown in FIG. 1, each wing 120 extends outwardly from the base member 110 and converges toward the other wing 120. In other words, in such embodiments, the base member 110 and each wing 120 form a "V" or "horseshoe" shape. In other embodiments not shown in FIG. 1, each wing 120 may be approximately perpendicular to the base member 110, or may diverge away from each other wing 120, and thus the base member 110 and each wing 120 collectively form other shapes. In some embodiments, each wing 120 has an end 122 opposite the base member 110, and each end 122 at least partially bounds and defines an opening 124 therebetween. In some further embodiments, the pair of wings 120 is configured to flexibly adjust a size of the opening 124. In such embodiments, the user can flexibly adjust one or both wings 120 to increase the size of the opening 124 to allow an object to pass through. In further embodiments, the user can then flexibly adjust one or both wings 120 to decrease the size of the opening 124 to secure the object within the modular storage clip 100, or alternatively, the wings 120 may elastically narrow the opening 124 and secure the object. FIG. 1 shows a single pair of wings 120, but the present disclosure is not limited thereto. Those of ordinary skill in the art will readily appreciate that additional wing-type or non-wing structures could be added, for instance, to further secure the object within the modular storage clip 100.

The modular storage clip 100 includes a cavity 140, which is at least partially bounded by the base member 110 and each wing 120. As shown in FIG. 1, in some embodiments, the base member 110 and each wing 120 have inner walls, which face toward the cavity 140 and define at least part of the outer circumference of the cavity 140. As described above, in some embodiments, each wing 120 has an end 122, with an opening 124 therebetween. In such embodiments, each wing 120 and the base member 110 together describe a portion of the outer circumference of the cavity 140. In such embodiments where the opening 124 exists, the object may enter the cavity 140 via the opening 124, or the object may fit axially into the cavity 140 to be secured within. In other embodiments, each wing 120 converges such that the ends 122 touch or are connected, and thus, each wing 120 and the base member 110 together describe the entire outer circumference of the cavity 140. In such embodiments where the wings 120 are connected, the object may fit axially into the cavity 140 to be secured within. In some embodiments, the cavity 140 has one or more cross-sections which are circular, square, rectangular, trapezoidal, or the like, and the cavity 140 has a corresponding three-dimensional shape such as a cylinder, rectangular prism, or the like.

The modular storage clip 100 is configured to secure an object within the cavity 140. More specifically, the cavity 140, the base member 110, and each wing 120 may each be independently configured to secure an object within the cavity 140. In some embodiments, one or more of the cavity 140, the base member 110, and each wing 120 is configured to secure the object through one or more of a snap fit, a press fit, a clearance fit, a transition fit, a clamp, a joint, a hinge, or a clip, but the present disclosure is not limited thereto. Persons of ordinary skill in the art will readily appreciate that the modular storage clip 100 can secure the object via any feasible structure on the base member 110 or either wing 120, particularly the interiors of such components, which physically contacts the object within the cavity 140. Such structure may physically contact and secure the object within the cavity 140 via friction, gravity, elasticity, textured surfaces, interlocking, magnetization, or a combination thereof, but the present disclosure is not limited thereto. In some embodiments, one or more of the base member 110 and the pair of wings 120 include one or more protrusions 160 extending into the cavity 140. Such protrusions 160 are configured to secure the object within the cavity 140 through one or more of a snap fit, a press fit, a clearance fit, a transition fit, a clamp, a joint, a hinge, or a clip, but the present disclosure is not limited thereto. The protrusions 160 may physically contact and secure the object within the cavity 140 via friction, gravity, elasticity, textured surfaces, interlocking, magnetization, or a combination thereof, but the present disclosure is not limited thereto. In a particular embodiment as shown in FIG. 1, each wing 120 has three cylindrical protrusions 160 and the base member 110 has two cylindrical protrusions 160, but in other embodiments, each wing 120 and the base member 110 may independently include any number and shape of protrusions 160.

The modular storage clip 100 includes a connector 130 configured to removably attach to a second connector of a second modular storage clip. Generally, the connector 130 is configured to connect to one or more other connectors independently or simultaneously, form such connections without substantially interfering with the securement of the object in the cavity 140, and adjustably allow or prevent rotation around the points of such connections. In some embodiments as shown in FIG. 1, the connector 130 is disposed on an exterior surface 114 of the base member 110. In some further embodiments as shown in FIG. 1, the connector 130 includes two non-identical structures disposed on the exterior surface 114 at opposite ends 112 of the base member 110.

The connector 130 may be configured to easily attach to and detach from the second connector through one or more of a snap fit, a press fit, a clearance fit, a transition fit, a clamp, a joint, a hinge, or a clip, but the present disclosure is not limited thereto. For instance, the connector 130 may removably attach to the second connector via friction, gravity, elasticity, textured surfaces, interlocking, magnetization, or a combination thereof, such as form-locking, force-locking, or fitting, but the present disclosure is not limited thereto. Persons of ordinary skill in the art will readily appreciate that the present disclosure contemplates various types, structures, shapes, and numbers of connectors 130, and the present disclosure is not limited to any particular arrangement thereof that is shown or described herein.

In some embodiments, the connector 130 has a first configuration in which the modular storage clip 100 is pivotable around a point of connection with the second connector, and the connector 130 has a second configuration in which movement of the modular storage clip 100 around the point of connection is prevented. In such embodiments, when multiple modular storage clips 100 are connected to form a single structure, the user can adjust any connector 130 to allow independent movement of one or more modular storage clips 100 around the point of connection between two or more connectors 130, and the user can independently adjust any connector 130 to "lock" the corresponding point or points of connection and maintain the current structure. Where freedom of movement around the point of connection is maintained, modular storage clips 100 may be pivoted and arranged to form various structural configurations, which may include lines, spheres, coils, grids, and cubes, but are not limited thereto. The user can form any number of structural configurations to satisfy the user's needs, such as for compact storage, ease of organization and access, and other user-specific considerations.

Figure 2:
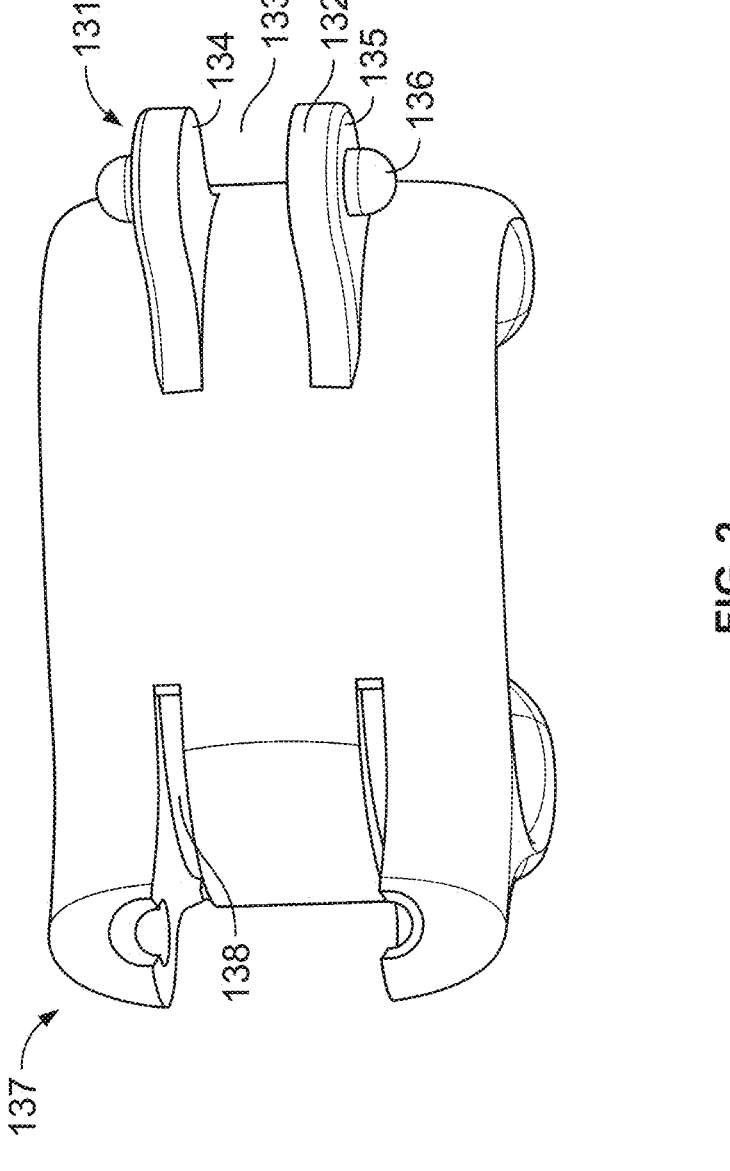
FIG. 2 is a top view showing the modular storage clip according to one or more embodiments.

FIG. 2 shows a top view of the modular storage clip 100 according to one or more particular embodiments. In these particular embodiments, the connector 130 includes a male connection component 131 and a female connection component 137. In further embodiments as shown in FIG. 2, the male connection component 131 includes two symmetrical components 132 separated by a gap 133 therebetween. In still further embodiments, each symmetrical component 132 includes an inner wall 134 facing the other symmetrical component 132, an outer wall 135 opposite the inner wall 134, and a button 136 disposed on the outer wall 135 and configured to removably attach to a portion of the female connection component 137. Thus, in these particular embodiments, persons of ordinary skill in the art will readily appreciate that a user in possession of several modular storage clips 100 can easily connect the male connection component 131 of a first modular storage clip 100 to the female connection component 137 of a second modular storage clip 100, and furthermore can connect several modular storage clips 100 in series in this fashion to create a large, connected structure.

The modular storage clip 100 may be prepared by any suitable manufacturing method known to those of ordinary skill in the art. In some particular embodiments, the modular storage clip 100 is manufactured by an injection molding process, wherein a mold having the shape of the modular storage clip 100 is injected with a molten material, cooled to dry and form the modular storage clip 100 within the mold, and then pushed out of the mold using ejector pins. Injection molding is a particularly preferred method of forming thermoplastic components of the modular storage clip 100, and is even more particularly preferred when each of the base member 110 and the wings 120 have identical compositions including a thermoplastic. In some particular embodiments as shown in FIG. 2, the female connection component 137 includes two ruts 138, which at least partially prevent undercutting of the modular storage clip 100 during the injection molding.

Further provided herein is a kit containing a plurality of modular storage clips 100. Each modular storage clip 100 includes components which were described above with reference to FIGS. 1 and 2, and these descriptions are equally applicable to each modular storage clip 100 in the plurality and the kit, except as otherwise described below. For instance, each modular storage clip 100 includes a base member 100 and a pair of wings 120, each wing 120 connected to opposite ends 112 of the base member 100. Each modular storage clip 100 includes a cavity 140 configured to secure an object within, the cavity 140 being at least partially bounded by the base member 110 and the pair of wings 120. Each modular storage clip 100 includes a connector 130, each connector 130 being configured to removably attach to the connector 130 of another modular storage clip 100.

Each connector 130 in the kit may independently be identical to or different from any other connector 130. In some embodiments, each connector 130 may be configured to easily attach to and detach from each other connector 130 through one or more of a snap fit, a press fit, a clearance fit, a transition fit, a clamp, a joint, a hinge, or a clip, but the present disclosure is not limited thereto. For instance, each connector 130 may removably attach to each other connector 130 via friction, gravity, elasticity, textured surfaces, interlocking, magnetization, or a combination thereof, such as form-locking, force-locking, or fitting, but the present disclosure is not limited thereto. In some embodiments, each connector 130 has a male connection component 131 and a female connection component 137, each male connection component 131 being configured to removably attach to each female connection component 137, and each female connection component 137 being configured to removably attach to each male connection component 131. In some embodiments, each connector 130 has a first configuration in which the modular storage clip 100 is pivotable around a point of connection with another connector 130, and each connector 130 has a second configuration in which movement of the modular storage clip 100 around the point of connection is prevented. Each connector 130 is independently adjustable between the first and second configurations. Thus, when a plurality of modular storage clips 100 is connected to form a single structure, various connection points may be independently pivoted or locked to stably form various structures.

Figure 3:
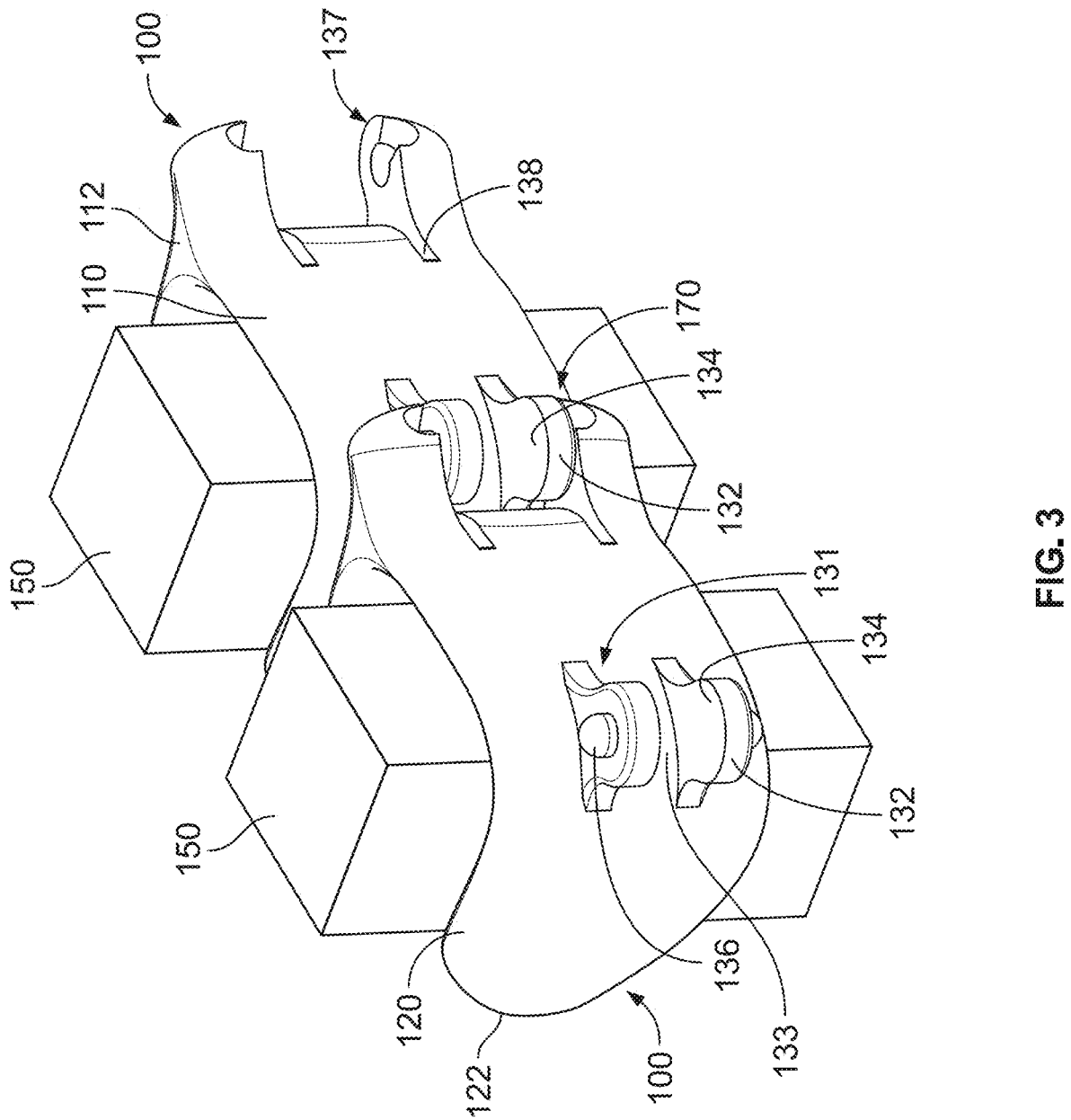
FIG. 3 is a perspective view showing two connected modular storage clips according to one or more embodiments.

FIG. 3 shows two modular storage clips 100 connected at a point of connection 170, each modular storage clip 100 securely holding an object 150 within the cavity 140. As described above, each connector 130 may be independently adjustable to allow or prevent rotation of each modular storage clip 100 around the point of connection 170. Furthermore, each modular storage clip 100 may be rotatable around any axis passing through the point of connection 170. For instance, with reference to FIG. 3, when the connectors

130 are configured to allow rotation around the point of connection 170, one modular storage clip 100 may rotate in a semi-circle toward a top or bottom face of the other modular storage clip, or toward a side face, or at angle therebetween.

FIG. 3 shows an object 150 secured within each cavity 140. In some embodiments, the cavity 140 is specifically configured to secure one or more cylindrical or rectangular prism-shaped cosmetic items, such as lipsticks, glosses, nail products, lipliners, eyeliners, eye shadows, mascaras, or other cosmetic items which are packaged in containers with an elongated shape. In such embodiments, the modular storage clips 100 are particularly advantageous because they allow a user to easily maintain objects 150 upright, as shown in FIG. 3, which prevents cosmetic products from spilling. Furthermore, some cosmetic products can be accessed and used within the modular storage clip 100 (e.g., by removing a lid while the remainder of the cosmetic item stays secured within the modular storage clip 100), further providing convenience to the user.

In some embodiments, in the plurality of modular storage clips 100 and the kit including the same, each modular storage clip 100 is the same size. In further embodiments, each modular storage clip 100 is approximately identical in size, shape, structure, function, or a combination thereof. In still further embodiments, and as shown in FIG. 3, each modular storage clip 100 is approximately identical in size, shape, structure, and function. In other embodiments, each modular storage clip 100 has an independent size, shape, structure, function, or combination thereof. The user can select a plurality of modular storage clips 100 and a kit or kits including the same to provide a desired arrangement of modular storage clips 100.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," and "third," are used herein to describe various elements, components, regions, layers and/or sections, these elements, components, regions, layers and/or sections should not be limited by these terms. These terms are only used to distinguish one element, component, region, layer and/or section from another element, component, region, layer and/or section. Thus, a "first element," "component," "region," "layer" and/or "section" discussed below could be termed a second element, component, region, layer and/or section without departing from the teachings herein.

Features illustrated or described as part of one embodiment can be used with another embodiment and such variations come within the scope of the appended claims and their equivalents. Implementations may also include one or a combination of any two or more of the aforementioned features or embodiments.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

The disclosure is illustrated throughout the written description. It should be understood that numerous variations are possible while adhering to the inventive concept. Such variations are contemplated as being a part of the present disclosure.

What is claimed is:

1. A modular storage clip, comprising:
an elongated base member having a first portion and a second portion,
  wherein the first portion and the second portions are on opposite ends of the elongated base member;
a first wing and a second wing, the first wing being connected to the first portion of the elongated base member, the second wing being to the second portion of the elongated base member;

a cavity configured to secure an object within, the cavity being at least partially bounded by the elongated base member and the pair of wings; and
a first connector disposed on the first portion of the elongated base member, the first connector being configured to removably attach to a fourth connector of a second modular storage clip,
  wherein the first connector includes a first component having a first inner wall and a first outer wall and a second component having a second inner wall and a second outer wall,
  wherein the first inner wall and the second inner wall faces each other and are separated by a gap,
  wherein the first outer wall is equipped with a first button and the second outer wall is equipped with a second button,
  wherein the first component and the second component are symmetrical;
a second connector disposed on the second portion of the elongated base member, the second connector being configured to removably attached to a fourth connector of the second modular storage clip,
  wherein the second connector has a third component having a first rut and a fourth component having a second rut,
  wherein the first rut and second rut are configured to facilitate rotational movement between second connector and the third connector when removably attached,
  wherein the second connector of the first modular storage clip is configured to receive and provide for the removable attachment to the third connector of the second modular storage clip,
  wherein the third component and the fourth component are symmetrical.

2. The modular storage clip of claim 1, wherein each of the first wing and the second wing extend outwardly from the elongated base member and converges toward the other wing.

3. The modular storage clip of claim 1, the first wing comprising a first end opposite the first portion of the elongated base member, and the second wing comprising a second end opposite the second portion of the elongated base member, wherein an opening is at least partially bounded by the first end and the second end.

4. The modular storage clip of claim 3, wherein the first wing and the second wing are configured to flexibly adjust a size of the opening.

5. The modular storage clip of claim 1, wherein the cavity is configured to secure the object through one or more of a snap fit, a press fit, a clearance fit, a transition fit, a clamp, a joint, a hinge, or a clip.

6. The modular storage clip of claim 1, the elongated base member further comprising a top surface and a bottom surface, wherein the bottom surface, the first wing, and the second wing each further comprising at least one protrusion extending into the cavity, the protrusion being configured to secure the object through one or more of a snap fit, a press fit, a clearance fit, a transition fit, a clamp, a joint, a hinge, or a clip.

7. The modular storage clip of claim 1, the first connector and the second connector each comprising a male connection component and a female connection component.

8. The modular storage clip of claim 7, the male connection component comprising two symmetrical components separated by a gap extending therebetween.

9. The modular storage clip of claim 8, each symmetrical component comprising:
  an inner wall facing the other symmetrical component;
  an outer wall opposite the inner wall; and
  a button disposed on the outer wall and configured to removably attach to a portion of the female connection component.

10. The modular storage clip of claim 1, wherein each of the first connector and second connector are configured to removably attach to the second modular storage clip through one or more of a snap fit, a press fit, a clearance fit, a transition fit, a clamp, a joint, a hinge, or a clip.

11. The modular storage clip of claim 1, each of the first connector and the second connector comprising:
  a first configuration wherein the modular storage clip is pivotable around a point of connection; and
  a second configuration wherein movement of the modular storage clip around the point of connection is prevented.

12. The modular storage clip of claim 1, the elongated base member further comprising a top surface and a bottom surface, wherein the bottom surface, the first wing, and the second wing each further comprising a plurality of protrusions extending into the cavity, each of the plurality of protrusions being configured to collectively secure the object.

13. The modular storage clip of claim 1, the first connector also extending above the elongated base member, the second connector also extending above the elongated base.

14. The modular storage clip of claim 2, the first wing comprising a first upper end and a first lower end, the second wing further comprising a second upper end and a second lower end,
  wherein the first lower end flares out in a first direction opposite that of the first upper end, and
  wherein the second lower end flared out in a second direction opposite that of the second upper end.

15. A kit containing a plurality of modular storage clips, each modular storage clip comprising:
  an elongated base member having a first portion and a second portion,
    wherein the first portion and the second portion are on opposite ends of the elongated base member;
  a first wing and a second wing, the first wing being connected to the first portion of the elongated base member, the second wing being to the second portion of the elongated base member;

a cavity configured to secure an object within, the cavity being at least partially bounded by the elongated base member, the first wing, and the second wing; and
a first connector disposed on the first portion, wherein the first connector includes a first component having a first inner wall and a first outer wall and a second component having a second inner wall and a second outer wall, wherein the first inner wall and the second inner wall face each other and are separated by a gap,
wherein the first outer wall is equipped with a first button and the second outer wall is equipped with a second button, wherein the first component and the second component are symmetrical;
a second connector disposed on the second portion, wherein the second connector has a third component having a first rut and a fourth component having a second rut,
wherein the first rut and the second rut are configured to facilitate rotational movement between receive and provide for the removable attachment to the first connector of another modular storage clip,
wherein the third component and the fourth component are symmetrical,
wherein the first connector and the second connector of each modular storage clip are each configured to receive and provide for the removable attachment to a complimentary connector of another modular storage clip.

16. The kit of claim 15,
each of the first connector and the second connector comprising a male connection component and a female connection component,
each male connection component being configured to removably attach to each female connection component, and
each female connection component being configured to removably attach to each male connection component.

17. The kit of claim 15, each connector comprising:
a first configuration wherein each modular storage clip is pivotable around a point of connection; and
a second configuration wherein movement of each modular storage clip around the point of connection is prevented,
  wherein each connector is independently adjustable between the first configuration and the second configuration.

* * * * *